United States Patent
Hay

(10) Patent No.: US 10,280,742 B2
(45) Date of Patent: May 7, 2019

(54) OPTICAL COUPLING SYSTEM FOR DOWNHOLE ROTATION VARIANT HOUSING

(71) Applicant: Halliburton Energy Services, Inc., Houston, TX (US)

(72) Inventor: Richard Thomas Hay, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 74 days.

(21) Appl. No.: 15/510,532

(22) PCT Filed: Dec. 29, 2014

(86) PCT No.: PCT/US2014/072545
§ 371 (c)(1),
(2) Date: Mar. 10, 2017

(87) PCT Pub. No.: WO2016/108821
PCT Pub. Date: Jul. 7, 2016

(65) Prior Publication Data
US 2017/0292371 A1    Oct. 12, 2017

(51) Int. Cl.
*E21B 47/12* (2012.01)
*E21B 44/00* (2006.01)
(Continued)

(52) U.S. Cl.
CPC ............ *E21B 47/123* (2013.01); *E21B 7/062* (2013.01); *E21B 17/1057* (2013.01);
(Continued)

(58) Field of Classification Search
CPC ....... E21B 47/124; E21B 47/18; E21B 47/123
See application file for complete search history.

(56) References Cited

U.S. PATENT DOCUMENTS 4,285,236 A    8/1981 Chien
4,962,495 A    10/1990 Gibbons et al.
(Continued)

FOREIGN PATENT DOCUMENTS

WO    1998/017894 A2    4/1998

OTHER PUBLICATIONS

International Preliminary Report on Patentability issued in related Application No. PCT/US2014/072545, dated Jul. 13, 2017 (12 pages).
(Continued)

*Primary Examiner* — Ryan D Walsh
(74) *Attorney, Agent, or Firm* — Jason Sedano; Baker Botts L.L.P.

(57) ABSTRACT

Systems and methods for optical communication in a downhole tool are disclosed. An optical communication system includes a rotation-varying outer housing that is at least partially rotationally decoupled from an inner member. The inner member is at least partially disposed within the rotation-varying outer housing. The optical communication system also includes one or more transceiver modules, one or more transmitting bulbs rotationally coupled to one of the outer housing or the inner member, and one or more optical sensors rotationally coupled to one of the outer housing or the inner member. The transmitting bulbs are configured to transmit light over at least a portion of a cavity between the transmitting bulbs and the optical sensors, and the optical sensors are configured to receive light over at least a portion of a cavity between the transmitting bulbs and the optical sensors.

20 Claims, 11 Drawing Sheets

(51) Int. Cl.
  *E21B 17/10* (2006.01)
  *E21B 47/18* (2012.01)
  *E21B 7/06* (2006.01)
  *F21V 8/00* (2006.01)
  *G02B 6/26* (2006.01)
  *E21B 12/00* (2006.01)

(52) U.S. Cl.
  CPC ............ *E21B 44/00* (2013.01); *E21B 47/124* (2013.01); *E21B 47/18* (2013.01); *G02B 6/0006* (2013.01); *G02B 6/26* (2013.01); *E21B 12/00* (2013.01)

(56) References Cited

U.S. PATENT DOCUMENTS

| | | | |
|---|---|---|---|
| 5,166,747 A | 11/1992 | Schroeder et al. | |
| 5,272,350 A | 12/1993 | Solari et al. | |
| 6,176,323 B1 * | 1/2001 | Weirich | E21B 21/08 175/40 |
| 6,426,497 B1 | 7/2002 | Martinez et al. | |
| 6,439,325 B1 | 8/2002 | Peters et al. | |
| 6,540,032 B1 | 4/2003 | Krueger | |
| 7,168,510 B2 | 1/2007 | Boyle et al. | |
| 7,336,199 B2 | 2/2008 | Lasater et al. | |
| 8,102,276 B2 | 1/2012 | Sugiura | |
| 2005/0046586 A1 | 3/2005 | Hall et al. | |
| 2008/0294344 A1 | 11/2008 | Sugiura | |
| 2009/0236144 A1 * | 9/2009 | Todd | E21B 17/01 175/5 |
| 2010/0200295 A1 * | 8/2010 | Schimanski | E21B 7/062 175/45 |
| 2010/0224356 A1 | 9/2010 | Moore | |
| 2012/0090827 A1 | 4/2012 | Sugiura | |
| 2014/0180591 A1 | 6/2014 | Hsu et al. | |
| 2017/0204725 A1 * | 7/2017 | Lines | E21B 47/123 |
| 2018/0038218 A1 * | 2/2018 | Hay | E21B 47/022 |

OTHER PUBLICATIONS

International Search Report and Written Opinion issued in related PCT Application No. PCT/US2014/072545 dated Sep. 3, 2015, 16 pages.

* cited by examiner

OPTICAL COUPLING SYSTEM FOR DOWNHOLE ROTATION VARIANT HOUSING

CROSS-REFERENCE TO RELATED APPLICATION

The present application is a U.S. National Stage Application of International Application No. PCT/US2014/072545 filed Dec. 29, 2014, which is incorporated herein by reference in its entirety for all purposes.

BACKGROUND

The present disclosure relates to methods and systems of communication between equipment used in subterranean operations. More particularly, the present disclosure relates to optical bi-directional communication between rotating and non-rotating or rotation-varying members of a downhole tool.

During drilling and production operations, it may be necessary to identify certain downhole characteristics, including fluid, formation, cement, and pipe properties, to aid in drilling decisions. Numerous measurement techniques are used, including logging while drilling (LWD), measuring while drilling (MWD), and wireline tests.

LWD tools and methods evaluate multiple parameters, such as formation resistivity to determine the types of minerals and/or fluids that comprise the formation. LWD tools incorporate measurement devices into a bottom hole assembly (BHA) in order to obtain measurements as soon as possible after the well wall is drilled. LWD has thus far been attached to the drill string, for example, in specially adapted drill collars located just above the drill bit. Thus, the sensors incorporated into these LWD tools will typically detect formation properties at a depth only after the drill bit drills past that depth.

In addition, it may be necessary to have elements in the drill string that rotate at different rates from that of the drill string itself, including non-rotating or slowly rotating members or in the opposite direction of the drill string rotation. Such drill string elements are used for creating geostationary orientation platforms such as in rotary steerable tools. Other applications may need a geostationary platform for making measurements of the formation such as rock properties. Some elements may need to be rotated while the drill sting does not rotate to make azimuthal measurements such as formation resistivity anisotropic measurements.

In all these cases, there is a need to communicate data and/or commands between two rotationally variant members of the drill string. These members can be located at any point in the drill string but most commonly are found in the BHA area of the drill string near the distal end of the drill string.

As sensor technology progresses, there is a need to move more and more data from the sensors to memory locations elsewhere in the drill string for later retrieval or further processing. Such data may also be needed in real-time on surface and needs to be transmitted to surface over high data rate telemetry systems such as high speed acoustic channels, EM telemetry, wired drill pipe, fiber optics, EM wave guides, or pipe-in-pipe communication systems. Such data rates can easily be required to be in the thousands to millions of bits per second. As technology improves, we may yet see gigabit volumes of data transference on a routine basis to characterize formations with various sensor technology.

Further, with the advent of laser drilling and pulse power drilling, high electromagnetic pulse energy levels may be present in the BHA during drilling operations with these systems. The communications bus may carry voltages in excess of 10,000 volts or more. In such instances, it is difficult to isolate sensitive electronics from these kinds of electromagnetic pulse (EMP) energies.

BRIEF DESCRIPTION OF THE DRAWINGS

These drawings illustrate certain aspects of some of the embodiments of the present disclosure, and should not be used to limit or define the disclosure.

Figure 1:
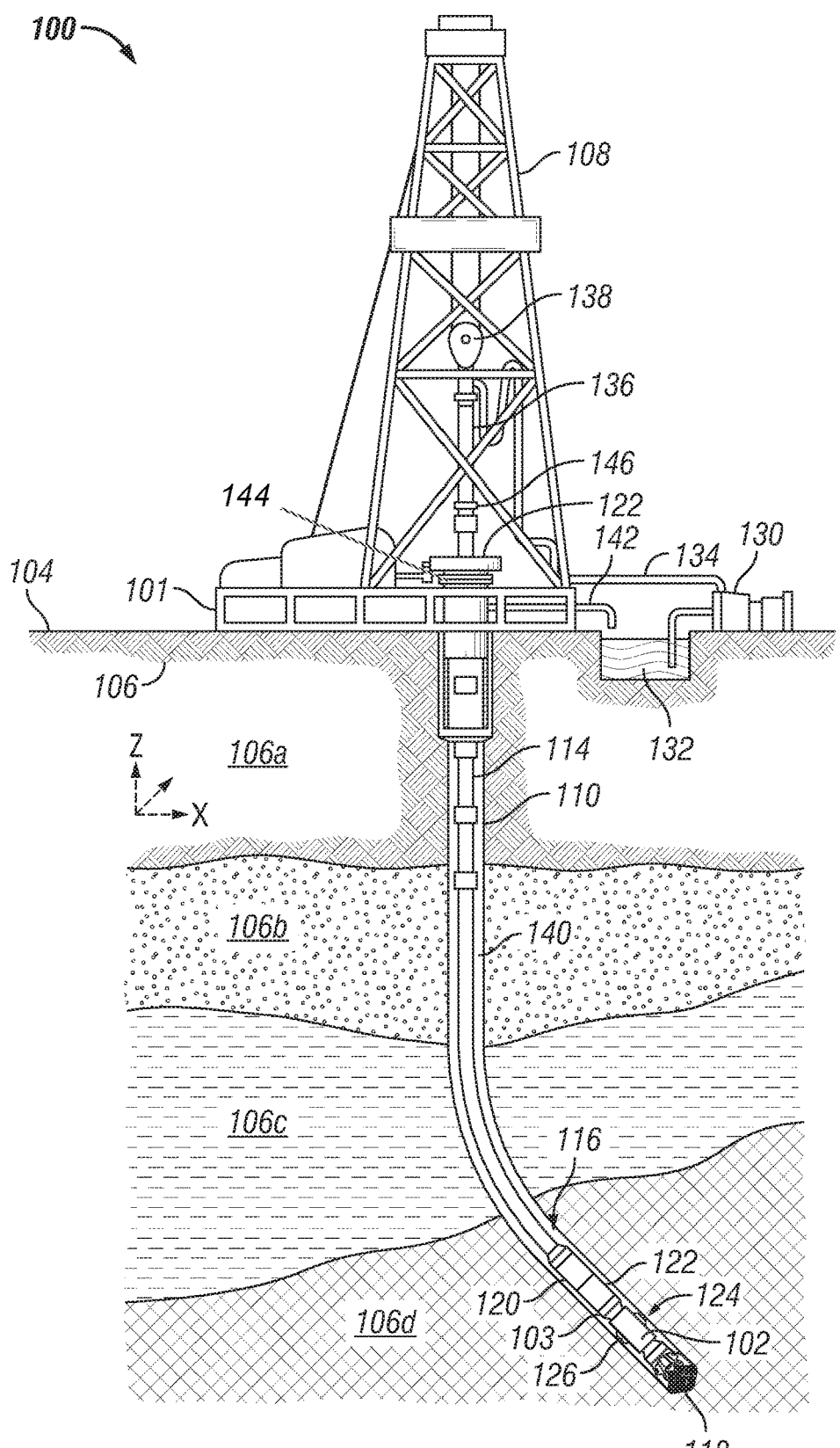
FIG. 1 illustrates a first exemplary drilling system, according to certain aspects of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates to methods and systems for use in subterranean operations. More particularly, the present disclosure relates to methods and systems of communicating with equipment used in subterranean operations.

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Devices and methods in accordance with embodiments described herein may be used in one or more of MWD and LWD operations. Embodiments described below with respect to one implementation are not intended to be limiting.

The terms "couple" or "couples" as used herein are intended to mean either an indirect or a direct connection. Thus, if a first device couples to a second device, that connection may be through a direct connection, or through an indirect mechanical or electrical connection via other devices and connections. The term "uphole" as used herein means along the drill string or the hole from the distal end towards the surface, and "downhole" as used herein means along the drill string or the hole from the surface towards the distal end.

The present application describes embodiments of an optical coupling system for a downhole rotation resistant housing that may be used for communication between equipment used in subterranean operations. As will be described below, certain embodiments may include the optical coupling system of the present disclosure utilized within a conventional or pipe-in-pipe subterranean drilling system that includes a rotary steerable tool, or within any conventional or pipe-in-pipe subterranean drilling system that includes rotation-varying members (relative to the drill string/work string), for example, any non-rotating or rotation-varying housing or sleeve surrounding the drill string/work string or any other housing rotating in the opposite direction as the drill string/work string, as would be appreciated by one of ordinary skill in the art with the benefit of the present disclosure.

FIG. 1 is a diagram of an exemplary subterranean drilling system 100 including a rotary steerable tool and an optical coupling system according to certain aspects of the present disclosure. The drilling system 100 comprises a drilling platform 101 positioned at the surface 104. In the embodiment shown, the surface 104 comprises the top of a formation 106 containing one or more rock strata or layers 106a-d, and the drilling platform 102 may be in contact with the surface 104. In other embodiments, such as in an off-shore drilling operation, the surface 104 may be separated from the drilling platform 101 by a volume of water.

The drilling system 100 comprises a derrick 108 supported by the drilling platform 101 and having a traveling block 138 for raising and lowering a drill string or work string 114 (hereinafter referred to as a drill string). A kelly 136 may support the drill string 114 as it is lowered through a rotary table 142 into a borehole 110. A pump 130 may circulate drilling fluid through a feed pipe 134 to the kelly 136, downhole through the interior of the drill string 114, through orifices in a drill bit 118, back to the surface via an annulus 140 formed by the drill string 114 and the wall of the borehole 110. Once at the surface, the drilling fluid may exit the annulus 140 through a pipe 142 and into a retention pit 132. The drilling fluid transports cuttings from the borehole 110 into the pit 132 and aids in maintaining integrity of the borehole 110.

The drilling system 100 may comprise a bottom hole assembly (BHA) 116 coupled to the drill string 114 near the drill bit 118. The BHA 116 may comprise a LWD/MWD tool 122 and a telemetry module 120. The LWD/MWD tool 122 may include receivers and/or transmitters (e.g., antennas capable of receiving and/or transmitting one or more electromagnetic signals). As the borehole 110 is extended through the formations 106, the LWD/MWD tool 122 may collect measurements relating to various formation properties as well as the tool orientation and position and various other drilling conditions. The telemetry module 120 may transfer measurements from the LWD/MWD tool 122 to a surface receiver 146 and/or receive commands from the surface receiver 146. The telemetry module 120 may transmit measurements or data through one or more wired or wireless communications channels (e.g., wired pipe or electromagnetic propagation). Alternatively, the telemetry module 120 may transmit data as a series of pressure pulses or modulations within a flow of drilling fluid (e.g., mud-pulse or mud-siren telemetry), or as a series of acoustic pulses that propagate to the surface through a medium, such as the drill string 114.

In accordance with certain aspects of the present disclosure, the drilling system 100 may be controlled, in part, using the telemetry module 120. The telemetry module 120 may be used to transmit real-time drilling mechanics and formation evaluation information uphole as the well is drilled. In the drilling system 100 shown in FIG. 1, LWD/MWD tool 122 may make measurements regarding certain formation, drilling and hole position characteristics, and the measurements may be modulated or encoded and sent to the surface receiver 146 at the surface. A control unit (not shown) may receive the telemetry data or transmit commands/data via surface receiver 146. The nature of the surface receiver will depend upon the method(s) used for telemetry. As would be appreciated by one of ordinary skill in the art, more than one mode of telemetry may co-exist in the system. Some forms of telemetry that may be utilized in a conventional drilling system include, but are not limited to, wave guide telemetry, fiber optic telemetry, pipe in pipe telemetry where two nested pipes facilitate two electrical conductors for communication, wired pipe telemetry, mud pulse telemetry, acoustic telemetry, torsion telemetry, and electromagnetic telemetry. In certain embodiments, these telemetry systems may be bi-directional in any combination. The received signal on the surface 104 may be transmitted from the sense point over a communications cable or via a wireless network connection 130 or other mode of telemetry on the surface 104 to the control unit (not shown). The control unit (not shown) may further demodulate the received data or modulate the transmitted commands or data, and translate the received data to some other useful form. Further, the system may be used to relay, exchange or receive data/commands/information, such as one or more intermediate positions between the surface 104 and the BHA 116 on the drill string 114, to or from other subsurface modules within telemetry range of a secondary downhole transmitter or receiver. Such additional positions may be network addressable to distinguish them from other transceivers in the drill string 114.

The drill bit 118 may be driven by a downhole motor (not shown) and/or rotation of the drill string 114 to extend the borehole 110 through the formation 106 or both. In certain embodiments, the downhole motor (not shown) may be incorporated into the BHA 116 directly above the drill bit 118 and may rotate the drill bit 118 using power provided by the flow of drilling fluid through the drill string 114 or may be positioned above a rotary steerable tool 124 that is then connected to a drill bit 118. In embodiments where the drill bit 118 is driven by the rotation of the drill string 114, the rotary table 144 may impart torque and rotation to the drill string 114, which is then transmitted to the drill bit 118 by the drill string 114 and elements in the BHA 116.

In certain embodiments, the BHA 116 may further comprise a steering assembly, such as a rotary steerable tool 124. The rotary steerable tool 124 may comprise a housing 102 and a drive shaft 103. The drive shaft 103 may be at least partially disposed within the housing 102 of the rotary steerable tool 124. The rotary steerable tool 124 may further comprise an anti-rotation device 126. The rotary steerable tool 124 may be coupled to the drill bit 118 and may control the drilling direction of the drilling system 100 by controlling one or both of the angle of a longitudinal axis of the rotary steerable tool 124 with respect to the axis the borehole 110 and the angle of a longitudinal axis of the drill bit 118 with respect to the rotary steerable tool 124. Altering one or both of those angles may offset a tool face (not shown) of the drill bit 118 such that it is non-parallel with the bottom of the borehole 110, thereby causing the drilling assembly to extend the borehole with a directional offset.

Figure 2:
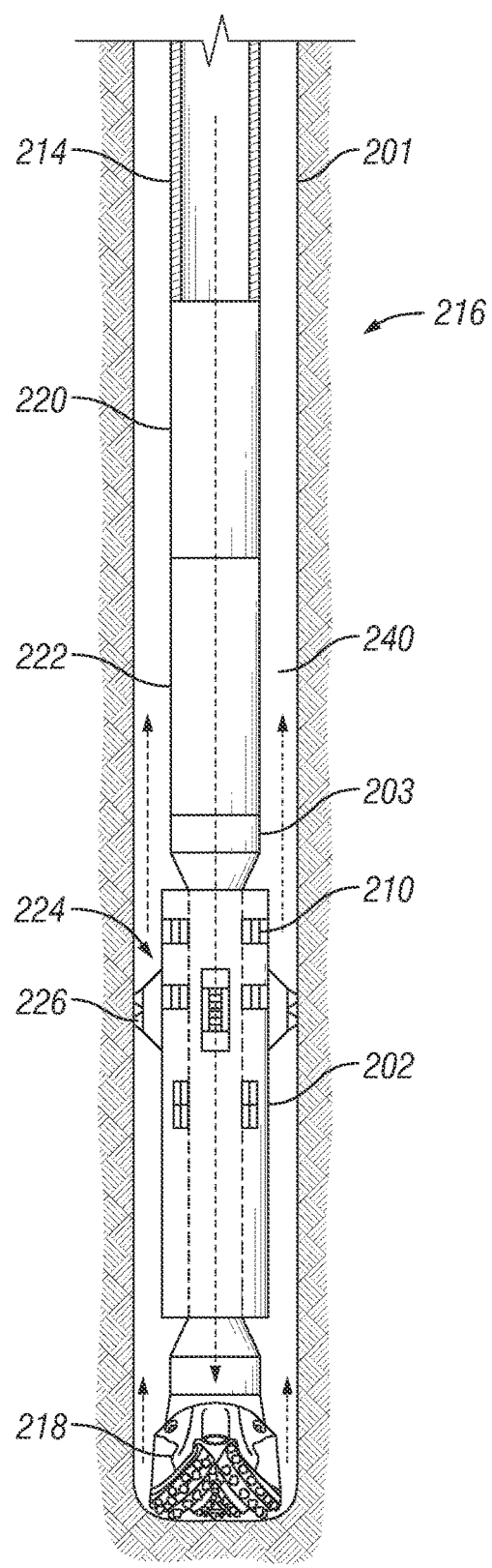
FIG. 2 illustrates a partial cross-sectional view of the first exemplary drilling system of FIG. 1 including a drill string and bottom hole assembly with a rotary steerable tool, according to certain aspects of the present disclosure.

FIG. 2 illustrates a partial cross-sectional view of the first exemplary drilling system shown in FIG. 1 including a drill string 214 and BHA 216 with a rotary steerable tool 224, according to certain aspects of the present disclosure. As shown in FIG. 2, the drilling system may comprise a drill string 214 and a BHA 216. The BHA 216 may be coupled to the drill string 214 near the drill bit 218. The BHA 216 may comprise a telemetry module 220, a LWD/MWD tool 222, and a rotary steerable tool 224. The rotary steerable tool 224 may comprise a housing 202 and a drive shaft 203. The drive shaft 203 may be at least partially disposed within the housing 202. The rotary steerable tool 224 may further comprise an anti-rotation device 226. The anti-rotation device 226 of the rotary steerable tool 224 may drag on the an inner wall of the borehole 201 thereby keeping the rotary steerable tool 224 stationary or near stationary with respect to the earth while the drill string 214 rotates. When the bearing friction is lower than the drag force of the anti-rotation device 226, the housing 202 will remain stationary as the anti-rotation device 226 applies enough drag force that is greater than the torsional force applied through one or more radial support bearings 210 by the rotating drill string 214.

Figure 3A:
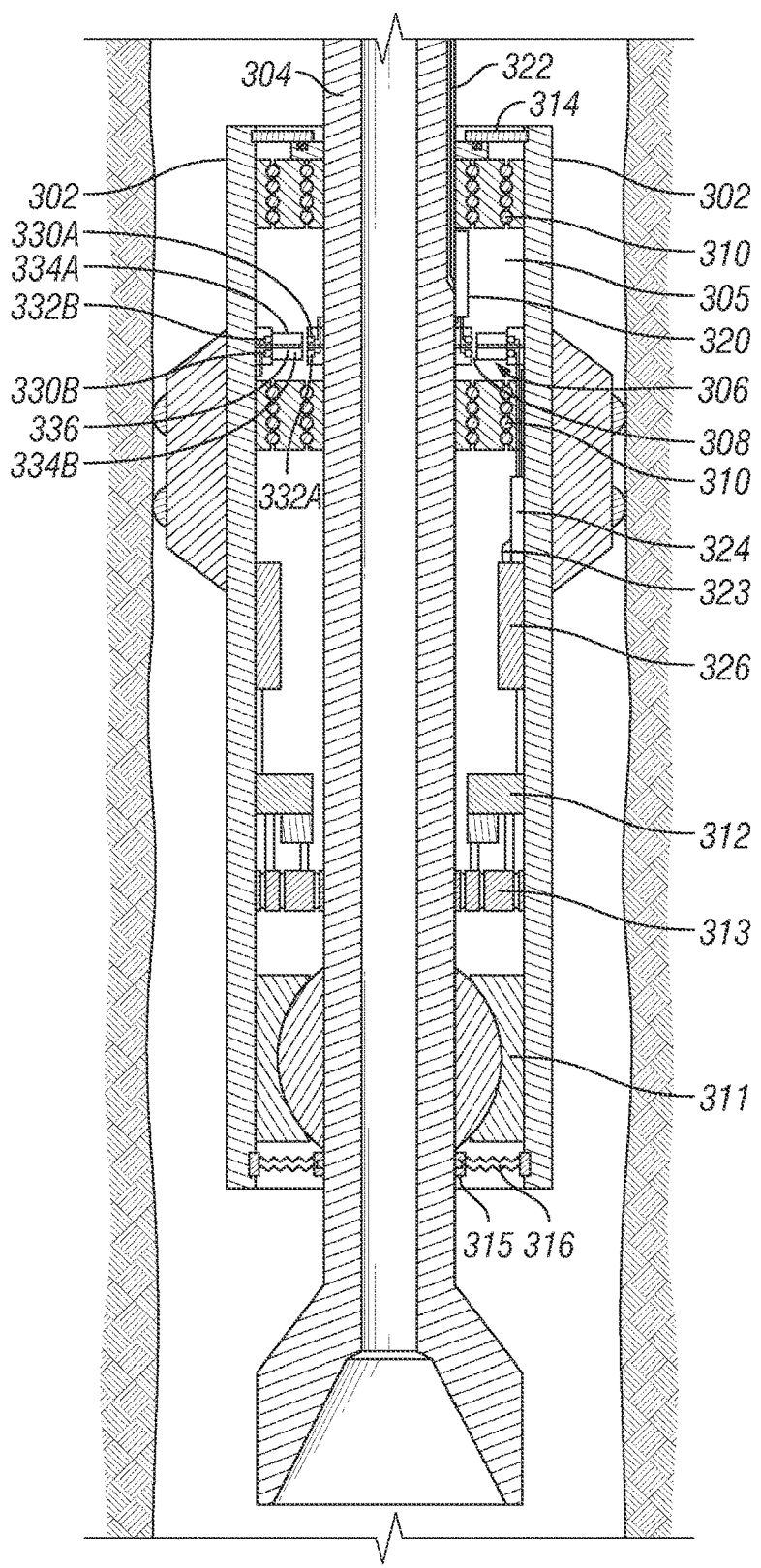
FIG. 3A illustrates a cross-sectional view of the exemplary rotary steerable tool from FIGS. 1 and 2 including an optical coupling system, according to certain aspects of the present disclosure.

Referring now to FIG. 3A, FIG. 3A illustrates a cross-sectional view of the exemplary rotary steerable tool from FIGS. 1 and 2 including an optical coupling system according to certain aspects of the present disclosure. An exemplary optical coupling system may comprise a length of rotation resistant or rotationally variant housing 302, which may surround an inner member, in this embodiment, a drill string or work string 304. In certain embodiments, the inner member may be a rotating member. The inner member 304 may run the length of the housing 302, and may be made of segmented sections of pipe or comprised of one uniform piece as shown in FIG. 3A. As shown in FIG. 3A, the inner member or drill string 304 may be at least partially disposed within the housing 302. The drill string 304 may axially support the housing 302. The housing 302 may be at least partially rotationally decoupled from the inner member or drill string 304. The housing 302 may be a rotational resistant or rotationally variant housing in that it does not rotate with the drill string 304 and may consist of multiple housings connected together that may surround multiple segments of pipe that make up the drill string 304. The drill string 304 may be a rotational element, such as a drill string drive shaft, drill pipe, production tubing, coil tubing, or solid bar rod or any other form of a work string. At least a portion of the drill string 304 may be made of a composite material and may have embedded or enclosed electrical conductors or fiber optic cables for communications and/or power purposes. The housing 302 may be generally stationary with the formation as the drill string 304 is rotated.

In certain embodiments, a cavity 305 between the housing 302 and the drill string 304 may comprise a fluid (liquid or gas). In certain embodiments, the cavity 305 may be a vacuum. In certain embodiments, however, the fluid may be a lubricant, and the lubricant may be used for lubrication of moving parts located between the housing 302 and drill string 304. These moving parts may include one or more radial support bearings 310, focal bearings 311, actuation mechanisms 312, such as clutches, harmonic drive transmissions, eccentric rings 313, and other bearings. One end of the cavity 305 is sealed with a rotary seal assembly 314 and the opposite end of the cavity 305 is sealed with a rotary seal assembly 315 and flexible barrier 316 which may permit the shaft to move as it is tilted about the focal bearing 311 by the eccentric rings 313. The rotary seal assemblies 314, 315 may provide for the retention of a fluid in the cavity 305. The rotary seal assemblies 314, 315 may provide for the retention of lubricant in the cavity 305 in embodiments where lubricant may be used.

In certain embodiments in accordance with the present disclosure, a first transceiver module 320 may be coupled to an outer surface of the drill string 304. The first transceiver module 320 may comprise a transmitter, a receiver, or both. A second transceiver module 324 may be coupled to an inner surface of the housing 302. The second transceiver module 324 may comprise a transmitter, a receiver, or both, depending on whether the data transmission employed in the given system is in a simplex, half-duplex, of full-duplex format, as would be appreciated by one of ordinary skill in the art with the benefit of the present disclosure. In certain embodiments, for example, where the drill string 304 is transmitting data to the housing 302 (i.e., simplex transmission), the first transceiver module 320 may be a transmitter and the second transceiver module 324 may be a receiver. In another embodiment, for example, where the housing 302 is transmitting data to the drill string 304 (i.e., simplex transmission in the opposite direction), the second transceiver module 324 may be a transmitter and the first transceiver module 320 may be a receiver.

A first communication bus 322 may run to the first transceiver module 320 from the control unit (not shown), discussed with respect to FIG. 1, or may run to a telemetry module (not shown) in the BHA (not shown), in which case the telemetry module may communicate with the control unit (not shown) or other communication points along the BHA (not shown) and drill string 304. In certain embodiments, the first communication bus 322 may comprise a power line. The transceiver module(s) 320, 324 may be used for transmitting and receiving signals between two or more optical communicator elements 330, 332. The first transceiver module 320 may convert electrical signals on the first communications bus 322 into a modulated format suitable for operating the optical communicator elements 330, 332. A second communication bus 323 may be located adjacent to the second transceiver module 324. The second communication bus 323 may be located between the second transceiver module 324 and a control system 326, as described below. In certain embodiments, the second communication bus 323 may comprise a power line. The second transceiver module 324 may convert electrical signal on the second communications bus 323 into a modulated format suitable for operating the optical communicator elements 330, 332.

The optical coupling system may further comprise a control system 326. The control system 326 for receiving data and instructions from the components and sensors within the housing 302 and transmitting the data through the optical communicator elements 330, 332 to the transceiver module 320 located on the drill string 304 side. As would be appreciated by one of ordinary skill in the art with the benefit of the present disclosure, data and instructions may flow from the drill string 304 to the transceiver module 324 on the housing 302 side in a reciprocal manner.

As would be appreciated by one of ordinary skill in the art with the benefit of the present disclosure, the present disclosure provides for a communication path to and from an inner member, in certain embodiments a drill string 304, to an outer housing 302. In certain embodiments, redundant communication paths may be added in either direction in the event one communication path fails. Further, the present disclosure may incorporate only a receiving path to gather data, information, and/or commands from in the control system 326, and from the other components and sensors within the housing 302.

The optical coupling system shown in FIG. 3A may further include one or more radial support bearings 310 positioned near the optical communicator elements 330, 332 and between the housing 302 and drill string 304 to prevent the cavity 305 from moving as the rotating drill string 304 bends, as would be the case in an embodiment including a rotary steerable tool. In the exemplary embodiment illustrated in FIG. 3, two radial support bearings 310 are used on each side of the optical communicator elements 330, 332 to maintain the width of the cavity 305.

Figure 3B:
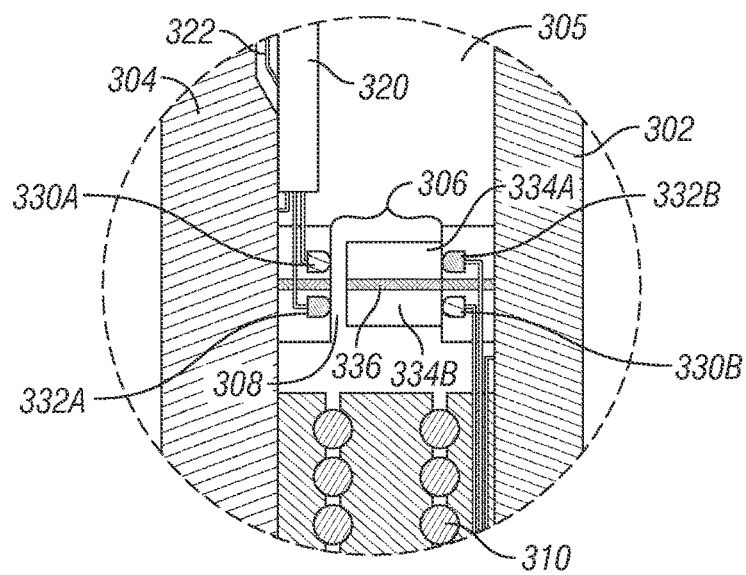
FIG. 3B illustrates a zoomed-in cross-sectional view of a portion of the exemplary optical coupling system from FIG. 3A, according to certain aspects of the present disclosure.

FIG. 3B illustrates a zoomed-in cross-sectional view of a portion of the exemplary optical coupling system shown in FIG. 3A. In the exemplary embodiment illustrated in FIG. 3B, the optical communicator elements 330, 332 may comprise one or more transmitter bulbs 330A, 330B and one or more optical sensors 332A, 332B. The optical communicator elements 330, 332 may be rotationally coupled to one of the housing 302 or drill string 304. The drill string-side optical communications elements 330A (transmitter bulb), 332A (optical sensor) may be proximate to the outer surface of the drill string 304. The drill string-side optical communications elements 330A (transmitter bulb), 332A (optical sensor) may be at least partially within the cavity 305 between the drill string 304 and the housing 302. The housing optical communications elements 330B (transmitter bulb), 332B (optical sensor) may be proximate to the inner surface of the housing 302. The housing optical communications elements 330B (transmitter bulb), 332B (optical sensor) may be at least partially within the cavity 305 between the drill string 304 and the housing 302. The drill string-side optical communicator elements 330A, 332A may be mounted in a hub or carrier that is coupled to the drill string 304 and may rotate with the drill string 304. The housing-side optical communicator elements 330B, 332B may be mounted in a hub or carrier that is coupled to the housing 302.

In certain embodiments, the transmitter bulbs 330A, 330B and the optical sensors 332A, 332B may be configured to establish a communications link between the inner member 304 and the outer housing 302. In certain embodiments, the established communications link may be bi-directional. A single transmitter bulb 330 may be able to communicate with a single optical sensor 332 or a plurality of optical sensors 332 at one time, or various different optical sensors 332 as rotation occurs. As would be appreciated by one of ordinary skill in the art with the benefit of the present disclosure, light signals from one or more transmitter bulbs may combine to form at least one combined signal or may result in a plurality of independent light signals. Further, each transmitter bulb 330 may independently form a unique communications channel to the one or more receiving optical sensors 332. The optical sensors 332 may further detect which transmitter bulb 330 they are receiving data from based on transmit frequency, data rate, data identification signals, etc., such that one or more signal pathways may exist between a transmitter bulb 330 and one or more optical sensors 332. Such signal pathways may contain all forms of signaling methods, including broadband binary transmission, amplitude modulation, frequency modulation, pulse position modulation, or any other suitable form of signaling methods known to those of ordinary skill in the art with the benefit of the present disclosure. One preferred embodiment would include a binary baseband digital communication technique where the absence or presence of light at a certain clocking frequency may result in binary data transmission across the signal pathway. Further, each transmitting bulb 330 may have digital or analog multiplexed channels for creating various forms of data exchange across independent channels or data exchange across multiple channels to further increase data exchange across a plurality of channels to use up more of the available bandwidth. In certain embodiments, the data transfer rate of certain channels may be slowed if the signal strength is detected to be weak by the analog sensing, whereas the data transfer rate of other channels may adaptably increase in channels with different frequencies that have a more optically compliant signal path.

The transmitter bulbs 330A, 330B may comprise any kind of light source that emits photon emissions detectable by the optical sensors 332A, 332B. As would be appreciated by one of skill in the art with the benefit of the present disclosure, suitable wavelengths may be any compatible spectrums such as infrared, near infrared, visible light, or x-rays, and may be either a single frequency of light emissions or a plurality of frequencies of light emissions. For example, the transmitter bulbs 330A, 330B may comprise a light emitting diode (LED) or an incandescent light source such as a halogen bulb or a laser.

In certain embodiments, the transmitter bulbs 330A, 330B may be configured to transmit light over at least a portion of an interface area 306 between the optical communicator elements 330, 332. Conversely, the optical sensors 332A, 332B may be configured to receive light over at least a portion of the interface area 306. The interface area 306 may be a portion of the cavity 305 located between the optical communicator elements 330, 332. For example, as illustrated in FIG. 3B, the interface area 306 is the area located between the housing optical communicator elements 330B, 332B and the drill string optical communicator elements 330A, 332A. In certain embodiments, the interface area 306 may comprise a fluid (liquid or gas), as explained with respect to the cavity 305. In certain embodiments, the fluid may be a lubricant.

In certain embodiments in accordance with the present invention, the optical coupling system of the present disclosure may also include a light-diffusing element 334 positioned between the housing optical communicator elements 330B, 332B and the drill string optical communicator elements 330A, 332A. In certain embodiments, as illustrated in FIG. 3B, the light-diffusing element 334 may be located within the interface area 306. In certain embodiments, the light-diffusing element 334 may comprise one or more optical diffusing rings 334A, 334B. The transmitter bulbs 330A, 330B comprise discrete light sources and the transmitter bulbs 330A, 330B do not always line up with the optical sensors 332A, 332B as the drill string 304 rotates relative to the housing 302. Accordingly, the diffusing rings 334A, 334B may be incorporated to permit the spreading of transmitted light to reduce the effects of any opacity that may exist or that may build up over time or through operational use in the lubricating fluid so that the light from the transmitter bulbs 330A, 330B intersects at least one optical sensor 332A, 332B on the other side of the interface area 306. In certain embodiments, the diffusing rings 334A, 334B may be separated by an optical barrier 336 to prevent cross talk between the two optical paths. The optical barrier 336 may be comprised of rubber or any other materials known to one of skill in the art to prevent unwanted communication between the two optical paths. In another embodiment, the light-diffusing element 334 may include only one optical diffusing ring. In this embodiment, the one optical diffusing ring could be used where the incoming and outgoing light share the same general path but in opposite directions. In this embodiment, it may be advantageous to have two different light frequencies used for each direction and to include receivers tuned to receive only the light from the intended transmitter. In certain embodiments, optical receivers such as photocells or PIN diodes or other photoelectric sensors may be fitted with optical filters to filter out light frequencies not associated with the desired transmitter signal. In this manner, cross talk between the two directions of communication may be limited but still may permit transmission within the same optical diffusing ring. For example, transmission to the second transceiver module 324 at the housing 302 may be accomplished with a blue light LED and transmission from the housing 302 to the first transceiver module 320 at the drill string 304 may be done with a red light LED.

As would be appreciated by one of ordinary skill in the art with the benefit of the present disclosure, the width of the interface area 306 may be kept as small as possible to reduce the amount of light that must pass through a fluid (i.e., liquid, gas, and/or lubricant, if any is present) in the interface area 206, particularly if the fluid is contaminated because the contamination may attenuate the signal. In certain embodiments, the interface area 306 may further include a gap 308. The light-diffusing element 334 (e.g., diffusing rings 334A, 334B) and the spreading of transmitted light resulting from the light-diffusing element 334, may allow the width of the gap 308 to be kept small, ideally from 0-5 mm. In certain embodiments, no gap (i.e., a gap of 0 mm) may be desirable to maximize the optical transmission so long as contact pressure remains small enough not to induce unmanageable torque into the housing from the differentially rotating drill string 304. In other words, in certain embodiments, the light-diffusing element 334 may be in slight contact with both the housing-side optical communicator elements 330B, 332B and the drill string-side optical communicator elements 330A, 332A. In the presence of a lubricating fluid, a thin film of the lubricating fluid may coat the surfaces of the diffusing element 334. In this manner, the arrangement may act as a journal-bearing surface under little to no contact pressure between the two rotation-varying surfaces. The light-diffusing element 334 may serve to permit the propagation of light in an optically transparent or semi-transparent span between the optical communicator elements 330, 332 and the transceiver modules 320, 324.

Figure 4A:
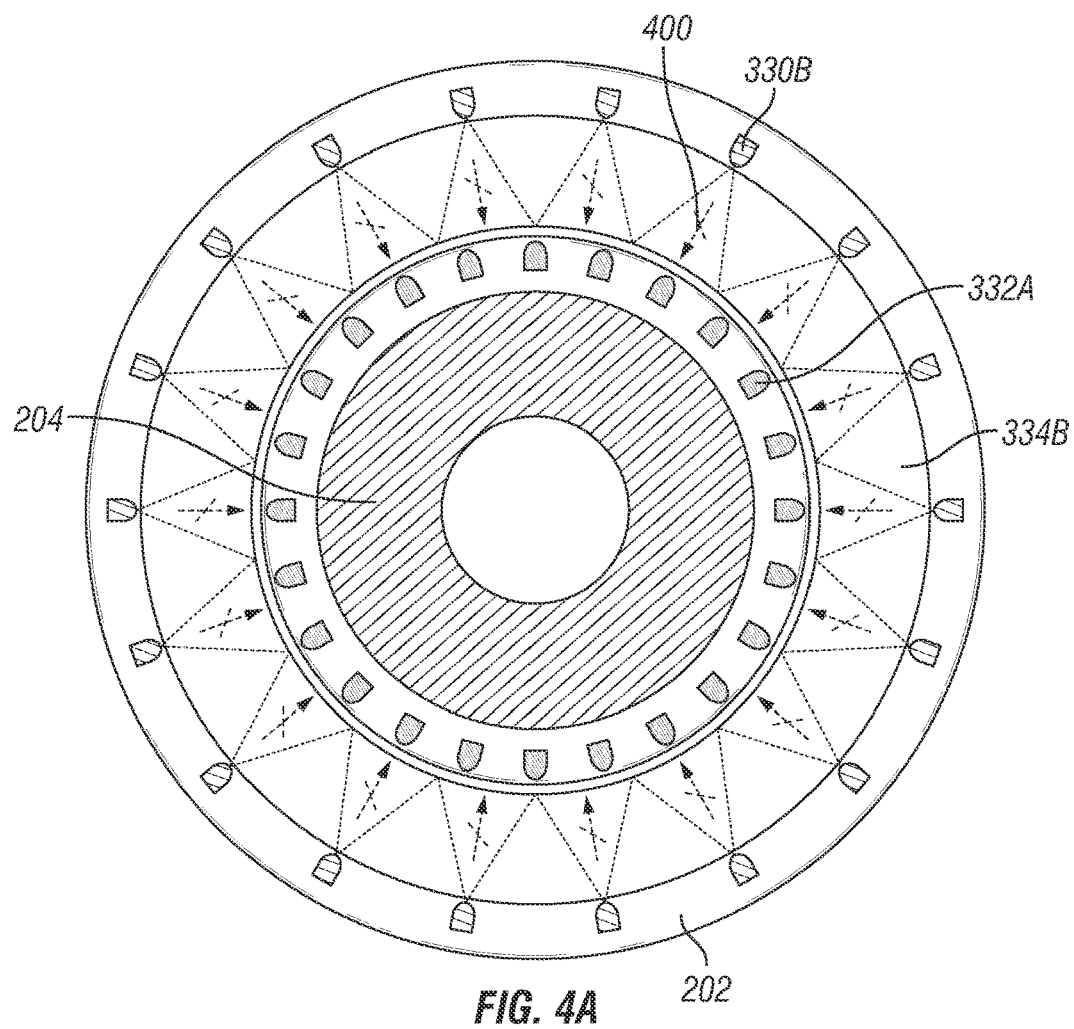
FIGS. 4A and 4B illustrate top views of the exemplary rotary steerable tool of FIGS. 1-3, according to certain aspects of the present disclosure.
Figure 4B:
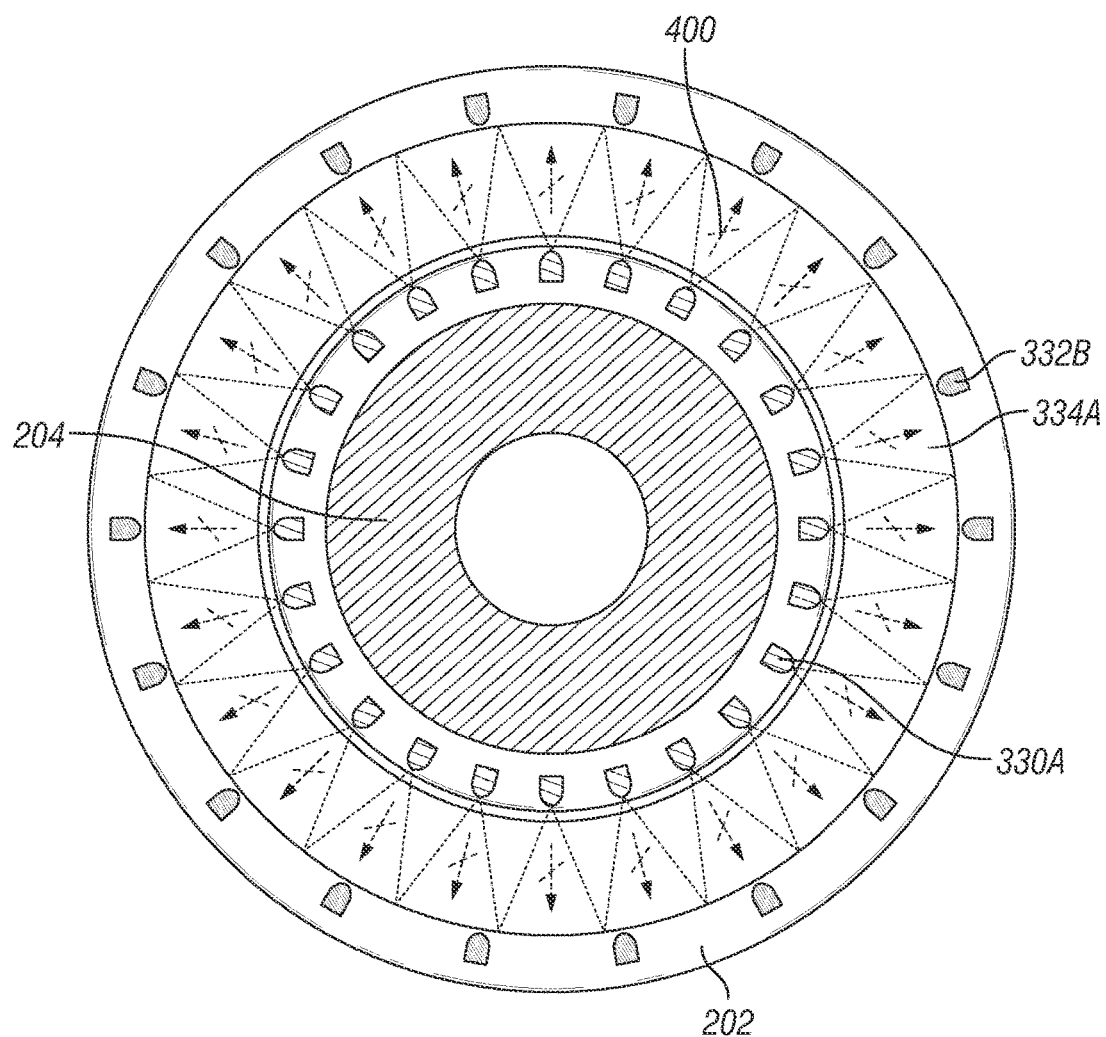

FIGS. 4A and 4B illustrate cut-out top views of the exemplary rotary steerable tool shown in FIG. 1. FIG. 4A shows the light communication path 400 from the housing-side transmitter bulbs 330B to the drill string-side optical sensors 332A. Because the two sides of the optical coupling are rotating relative to each another, the number of transmitter bulbs 330 and optical sensors 332 may be adjusted to guarantee that at any point in the rotation of the drill string 204, communication between the two sides is maintained. For example, if there were more power available outside the housing 202 than inside the housing 202, it may make sense to place more transmitter bulbs 330 on the drill-string side, as illustrated in the exemplary embodiment shown in FIG. 4B. If, however, an ample power source were available inside the housing 202, then the number of transmitter bulbs 330 located on the drill string-side may not matter so long as the light path is maintained by at least one pair of transmit and receive coupling nodes (i.e., a transmitter bulb 330 and optical sensor 332). As would be appreciated by one of ordinary skill in the art with the benefit of the present disclosure, the disclosed system may utilize one or more transmitter bulbs 330B and one or more optical sensors 332A, in any combination. For example, an exemplary system may use one transmitter bulbs 330B and a plurality of optical sensors 332A, such that at least one optical sensor 332A is in detection range of the one transmitter bulb 330B. In the example illustrated in FIG. 4B, the drill string-side has a transmitter bulb 330A placed about every 15 degrees of arc span, and the housing-side has an optical sensor 332B placed about every 20 degrees of arc span. The location and configurations of the optical communicator elements 330, 332 may also depend on the width of the transmitting light beam 400 from the transmitter bulb(s) 330 and how well the light-diffusing element (e.g., diffusion rings) are able to spread the light out across as much arc length as possible.

Figure 4C:
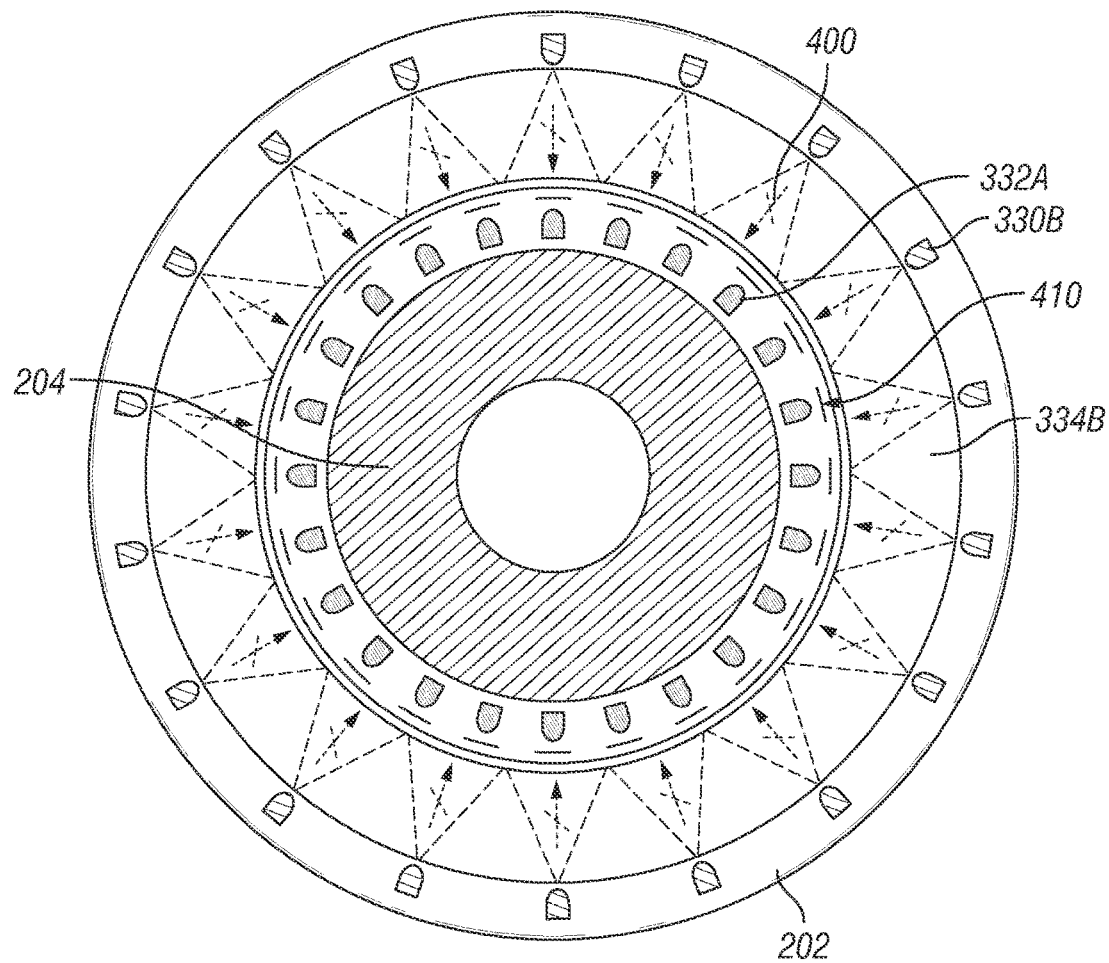
FIG. 4C illustrates a top view of an exemplary rotary steerable tool, according to certain aspects of the present disclosure.

FIG. 4C illustrates a cut-out top view of an exemplary rotary steerable tool with an optical coupling system. The optical coupling system is laid out in a similar manner as that shown FIG. 4A. FIG. 4C shows the light communication path 400 from the housing-side transmitter bulbs 330B to the drill string-side optical sensors 332A. The optical coupling system may further include a filter 410, as illustrated in FIG. 4C. The filter 410 may be positioned in front of one or more of the optical sensors 332A. The filter 410 may be tuned to block or allow light from one the adjacent transmitting bulb 330B. As would be appreciated by one of ordinary skill in the art with the benefit of the present disclosure, the filter 410 may be any variant of an optical filter including an absorptive filter, which are usually made from glass with inorganic or organic compounds added, a dichroic filter, a reflective or interference filter, a monochromatic filter, or any other filter known to one of ordinary skill in the art and suitable for the purposes disclosed herein. In certain embodiments, there may be a filter 410 placed in front of the optical sensor 332A, as shown in FIG. 4C, while in other embodiments, the filter 410 may be integrated with the optical sensor 332A. In certain embodiments, a hub or carrier that houses the optical sensor 332A may also have filtering properties on or within it along the light path 400.

As would be appreciated by one of ordinary skill with the benefit of the present invention, the optical coupling system of the present disclosure may be utilized within a conventional subterranean drilling system as described with reference to FIGS. 1 and 2. Additionally, the optical coupling system of the present disclosure may be utilized within a pipe-in-pipe subterranean drilling system. Further, the optical coupling system of the present disclosure may be utilized in a system with a rotary steerable tool or any system that includes differential rotating members, for example, any non-rotating or rotation-resistant housing or sleeve surrounding the drill string/work string or any other housing rotating in the opposite direction as the drill string/work string. Exemplary embodiments are described with reference to FIGS. 5 through 7.

Figure 5:
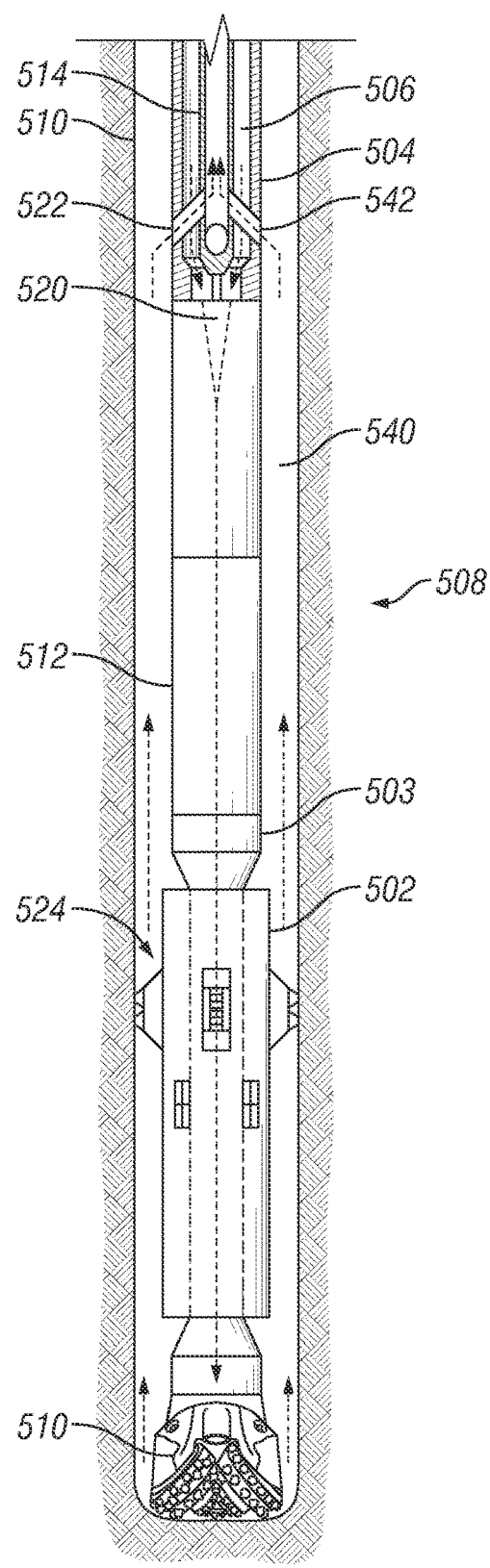
FIG. 5 illustrates a partial cross-sectional view of a first exemplary pipe-in-pipe drilling system, including a drill string, inner pipe, and bottom hole assembly with a rotary steerable tool, according to certain aspects of the present disclosure.

FIG. 5 illustrates a partial cross-sectional view of an exemplary pipe-in-pipe drilling system including a drill string 504, an inner pipe 506, and BHA 508 with a rotary steerable tool 524, according to certain aspects of the present disclosure. In a pipe-in-pipe drilling system, the rig (not shown) may be connected to multiple pipes 504 and 506 via a top drive (not shown). In this pipe-in-pipe embodiment, the inner pipe 506 may be disposed within the outer pipe 504. The outer pipe 504 may comprise a typical drill string that is used in conventional drilling operations such as drill pipe, coil tubing, casing or liner used for drilling. Fresh drilling mud may be pumped downhole toward the drill bit 510 through an annulus 514 between the inner pipe 506 and the drill string 504. The drilling mud may flow within the annulus 514 through a flow diverter 522. The flow diverter 522 may be positioned above or within the BHA 508. Thus, the inner pipe 506 may partially extend into the BHA 508 down to the drill bit 510. The flow diverter may convert the flow of mud from within the annulus 514 to a single flow path within the drill string eliminating the use of a counter direction flow path within the outer pipe 120 below the flow diverter 522. The central flowing fluid may then exit the drill bit 510 nozzles and may carry cuttings created by the drilling action of the drill bit 510 up the borehole annulus 540 to the diverter inlet ports 542. The cuttings and drilling fluid may enter the flow diverter inlet ports 542 and then in the inner pipe 506 to return to the surface. In another embodiment, the drill bit 510 may be a pulsed power electrode bit or a combination of a pulsed powered electrode bit with some mechanical drilling features such as fixed cutter polycrystalline diamond, natural diamond or roller cone structures used on conventional drill bits. In all these embodiments, reverse circulation may be employed meaning the direction of flow through the various passage ways may be reversed.

The BHA 508 may include a variety of measurement and logging tools such as a LWD/MWD tool 512, which are coupled to the outer pipe 504 and inner pipe 506. The drilling fluid may exit through the drill bit 510, lubricating the cutting surface as the drill bit rotates, and carrying cuttings from the formation back to the surface (not shown). As mentioned, in certain pipe-in-pipe drilling systems, at least a portion of the drilling fluid may return to the surface within annulus 540, and at least a portion of the drilling fluid may be diverted into the inner pipe 506. The BHA 508 may comprise a telemetry module 520 and a rotary steerable tool 524. The rotary steerable tool 524 may comprise a housing 502 and a drive shaft 503. The drive shaft 503 may be at least partially disposed within the housing 502. The rotary steerable tool 524 may further comprise an anti-rotation device 526. The anti-rotation device 526 of the rotary steerable tool 524 may be coupled to an inner wall of the borehole 510 thereby keeping the rotary steerable tool 524 stationary. The rotary steerable tool 524 may include an optical coupling system according to certain aspects of the present disclosure. The optical coupling system may further comprise all of the elements described with reference to FIG. 3.

The telemetry module 520 may be used to transmit real-time drilling mechanics and formation evaluation information uphole as the well is drilled, as explained with reference to FIG. 2. Additional forms of telemetry applicable in a pipe-in-pipe drilling system, may include, but are not limited to, using the inner pipe 506 and outer pipe 504 as a two conductor electrical path where the inner pipe 506 is electrically insulated from the outer pipe 504 in some manner so as to effect a signal transmission over the two conductors, or including wired drill pipe such as a conductive member inductively or electrically connected at the end points of pipe segments of the outer pipe 504 of an electrically insulated wire coupled primarily to the outer or inner surface of the inner pipe 506.

Figure 6:
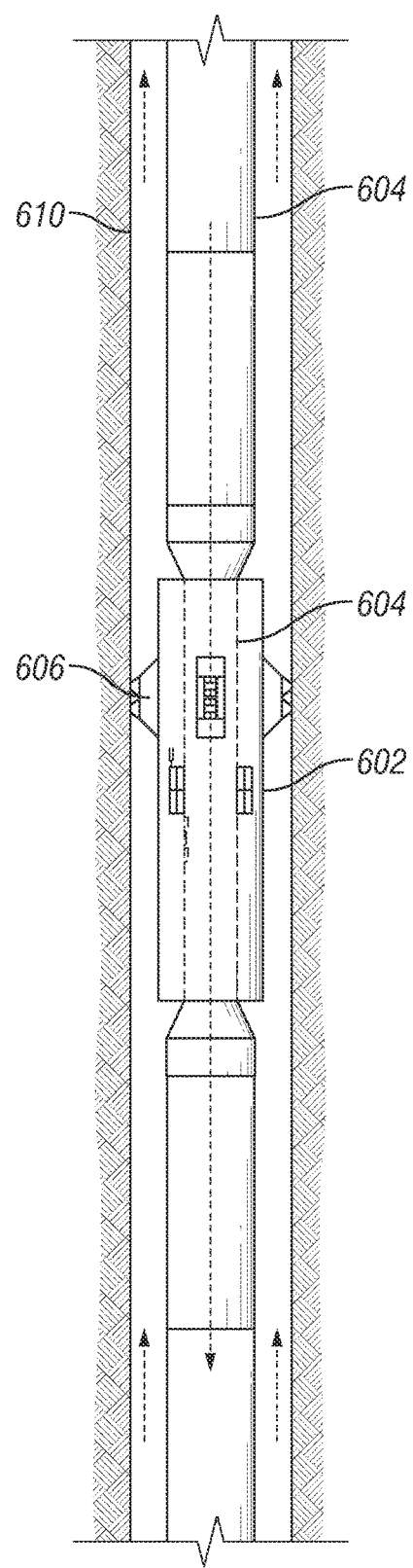
FIG. 6 illustrates a partial cross-sectional view of a second exemplary drilling system, including a rotation resistant housing in a drill string, according to certain aspects of the present disclosure.
Figure 7:
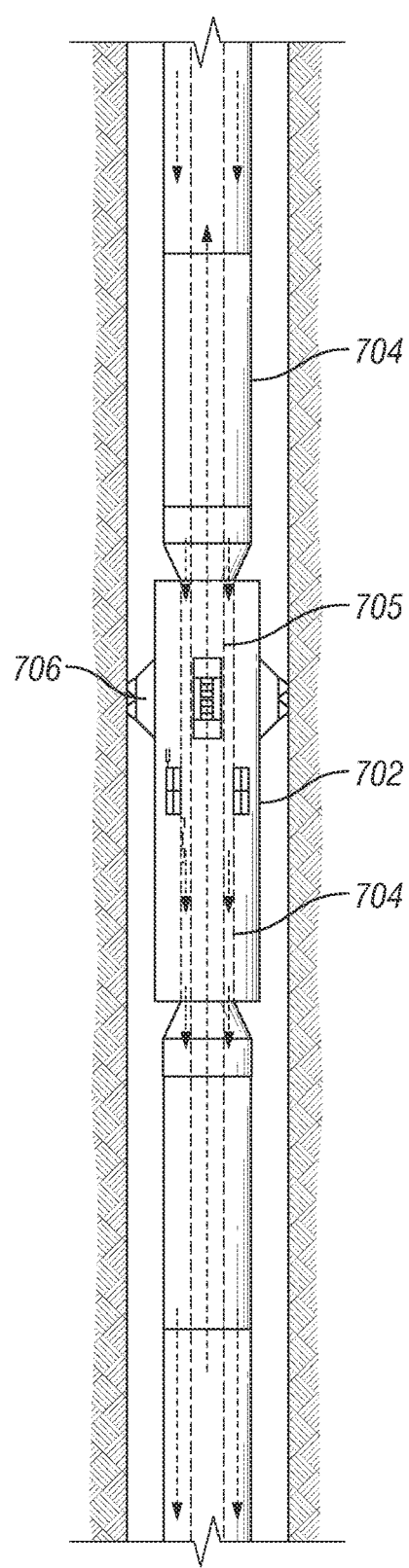
FIG. 7 illustrates a partial cross-sectional view of a second exemplary pipe-in-pipe drilling system, including a rotation resistant housing in a drill string, according to certain aspects of the present disclosure.

In certain embodiments, a drill string may not be flexed to effect pointing of the drill bit in a desired direction. In such embodiments, the outer housing may instead be positioned elsewhere in the BHA or at some other intermediate point on the drill sting between the drill bit and the surface. In such embodiments, the housing may serve as a position for supporting MWD/LWD and drilling sensors such as fluid pressure, tensile load, bending, torque in the housing. The housing may also contain local telemetry systems for either transmitting and/or receiving data and power from surface or from other points in the work string. FIGS. 6 and 7 illustrate a cross-sectional view of exemplary drilling systems, including a rotation resistant housing in a drill string, according to certain aspects of the present disclosure. FIG. 6 illustrates an exemplary conventional drilling system and FIG. 7 illustrates an exemplary pipe-in-pipe drilling system, both in accordance with certain aspects of the present disclosure.

As shown in FIGS. 6 and 7, an exemplary drilling system may comprise an optical coupling system within differential rotating members. The optical coupling system may comprise a length of rotation-varying housing 602, 702 which may surround the drill string 604, 704. The housing 602, 702 may further comprise an anti-rotation device 606, 706. The anti-rotation device 606, 706 may be coupled to an inner wall of the borehole 610 thereby keeping the rotation-varying housing 602, 702 stationary. The optical coupling system may further comprise all of the elements described with reference to FIG. 3.

In the exemplary pipe-in-pipe drilling system embodiment illustrated in FIG. 7, the housing 702 may surround the drill string 704 and the inner pipe 706, which is rotationally connected to the outer pipe which is the drill string 704. The optical coupling system may utilize standard drill pipe as the outer pipe 704 with the varying rotatable housing 702 surrounding a portion of the outer pipe 704, reducing the overall system cost. As will be appreciated by one of ordinary skill, the inner pipe 706 of a pipe-in-pipe drilling system does not carry the string weight, which is born by the drill string or outer pipe 704. Accordingly, the inner pipe elements may be made of cast rather than machined, or with reduced machining effort subsequent to the cast, reducing the system cost.

Referring back to FIG. 3, as would be appreciated by one of skill in the art with the benefit of the present disclosure, the analog signal strength of the light signal crossing the cavity 305 between the housing 302 and the drill string 304 may be measured. More specifically, the analog signal strength of the light signal crossing the interface area 306 between the transmitting bulbs 330 and the optical sensors 332 may be measured. As the light signal strength received by the optical sensor(s) 332 weakens, contamination of the lubricant (if any) in the cavity 305 and interface area 306 may be presumed. Accordingly, signal weakening can serve as an indication of contamination, which may signify excessive wear occurring inside of the tool or the presence of mud ingression. Further, different wavelengths of light may be utilized to ascertain the type of fluid contamination that may be occurring as certain types of contamination will absorb different wavelengths of light more readily than other wavelengths, as would be appreciated by one of ordinary skill in the art. For example, the presence of drilling fluid in the interface area 306 may have a characteristic profile of light absorption verses oil (i.e., lubricant). If the cavity 305 and the interface area 306 comprise a vacuum or an optically clear gas such as air or nitrogen, any drop in signal strength in the communication path may indicate the presence of debris or ingress of fluid. It is ideal to test for contamination when rotation of the drill string 304 stops because the overall signal strength received should be relatively constant. However, tests for contamination may occur during rotation and a simple algorithm may be utilized to monitor the average signal strength while rotating so that a drop in the average signal strength may indicate possible contamination, as would be appreciated by one of ordinary skill in the art with the benefit of the present disclosure.

The present disclosure also provides for a method of measuring inner member 304 (e.g., drill string) position, rotations per minute ("RPM"), and torsional vibration. In certain embodiments, the optical coupling system may include a separate hub used to mark a zero reference point between a single transmitter bulb 330 and an optical sensor 332. As would be understood by one of skill in the art with the benefit of the present disclosure, each rotation of the tool marks a reference point on the inner member 304 rotation. The number of light pulses received at any one of the optical sensors may be counted to determine the arc position of the inner member 304 relative to its home or starting position. A real-time clock or digital time may be used to calculate the position of the inner member 304, the RPM of the inner member 304, and/or the torsional vibration of the inner member 304 via the variance rate of the light signal transmitted across the interface area 306. As would be appreciated by one of skill the art with the benefit of the present disclosure, the variance in RPM data may be fed to the control system 326 and drilling forces, such as weight on bit or torque on bit, may be adjusted as needed by other BHA elements or on the surface. Such an automated control may be downhole or on the surface. If downhole, a downhole drilling tractor with a hydraulic piston or ram may be utilized to vary the weight applied to the bit.

Figure 8A:
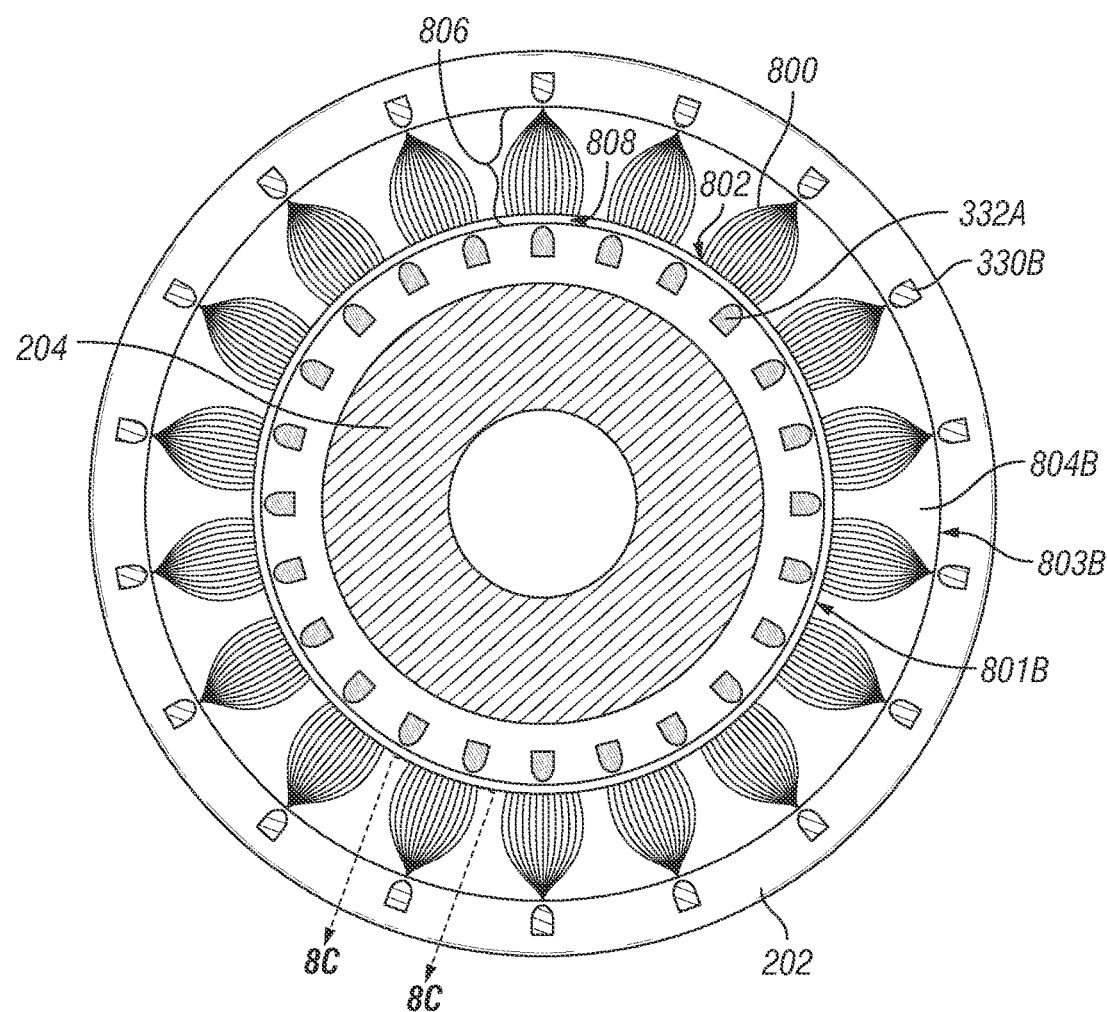
FIGS. 8A-8C illustrate top views of an exemplary rotary steerable tool with an optical coupling system, including a ring of open ended fiber optic strands, according to certain aspects of the present disclosure.
Figure 8B:
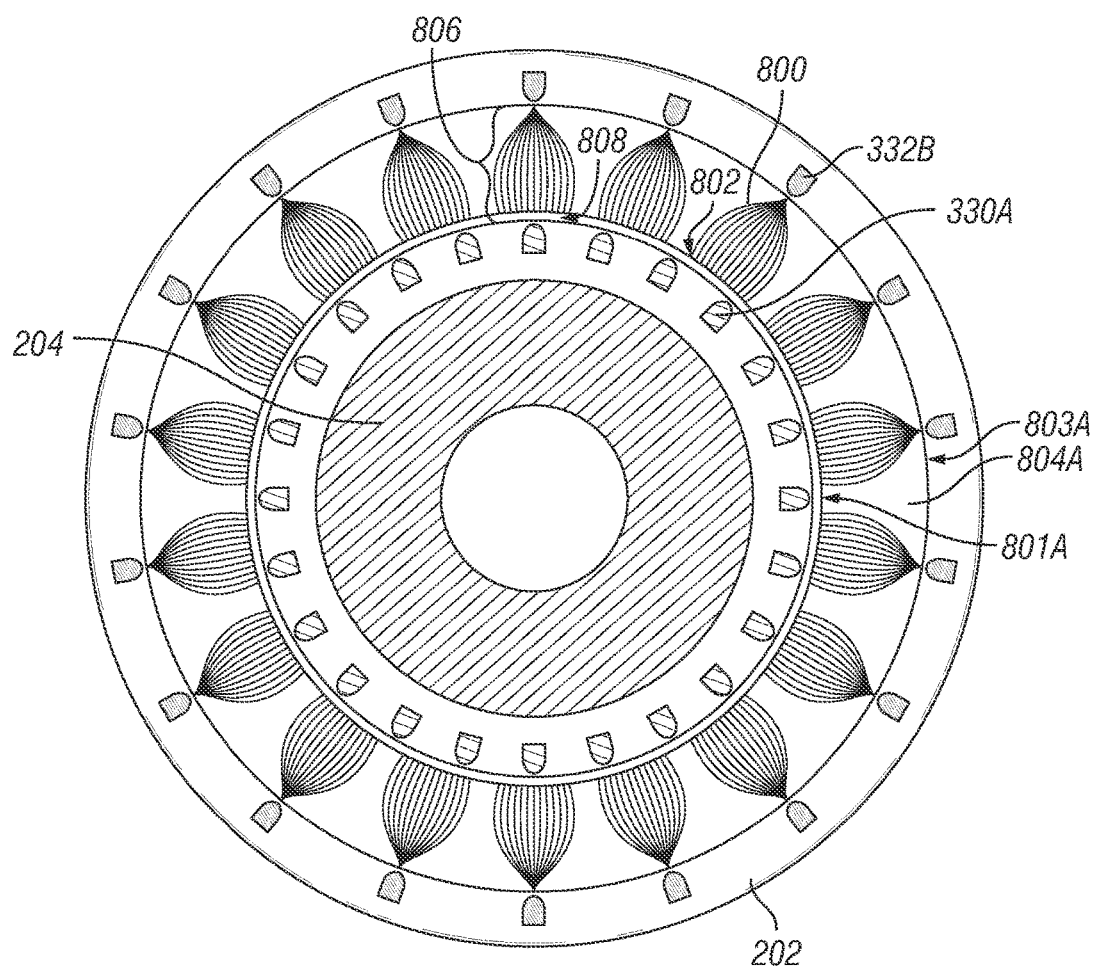
Figure 8C:
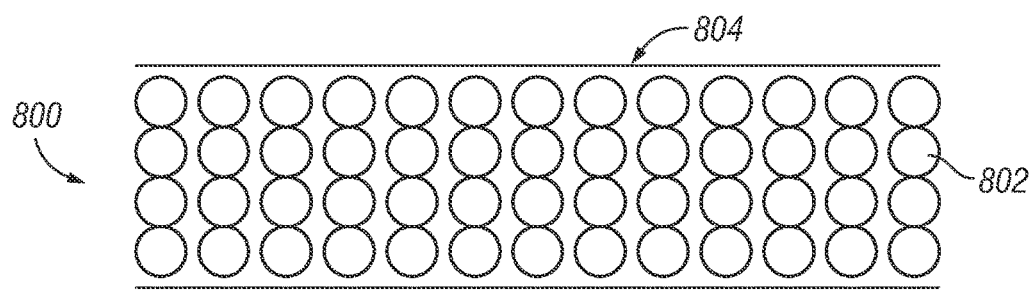

Finally, as shown in FIGS. 8A-8C, in certain embodiments, the system may further include a ring of open ended fiber optic strands/bundle 800. FIGS. 8A and 8B illustrate cut-out top views of an exemplary optical coupling system including a ring of open ended fiber optic strands that make up a fiber optic bundle 800. As illustrated in FIG. 8A, the transmitting bulbs 330B may transmit light across the interface area 806 to the optical sensors 332A via the fiber optic strands 800. As explained with reference to FIG. 3B, the interface area 806 may further include a gap 808. In certain embodiments, one end of the fiber optic bundle 800 may be positioned in front of or within the transmitter bulbs 330B and the opposite end may point towards a path on which the light from the transmitter bulb travels to reach the optical sensors 332A. The fiber optic strands 800 may be driven with at least one or more light sources to reduce the number of transmitter bulbs 330B needed. As illustrated in FIG. 8B, the transmitting bulbs 330A may transmit light across the interface area 806 to the fiber optic stands 800. The light may then travel along the fiber optic strands 800 and merge at an optical sensor 332B. In certain embodiments, the fiber optic strands 800 on the receiving end (adjacent the optical sensors 332B) may be used to route the received light signal from the transmitter bulb 330A to at least one optical sensor 332B.

In certain embodiments, the closed end of the fiber optic strands 800 may be bundled or merged together in front of or within the transmitter bulbs 330B and may permit light from at least one transmitting bulb 330B to be dispersed across a wider area via the distribution of the fiber optic strands 800, as illustrated in FIG. 8A. Likewise in certain embodiments, the closed end of the fiber optic stands 800 may be bundled or merged together in front of or within the optical sensor 332B and may permit light from at least one transmitter bulb 330A to be routed within at least one fiber optic strand within the fiber optic bundle 800 to at least one optical sensor 332B, as illustrated in FIG. 8B. In this illustrative embodiment, where light travels over a plurality of fiber optic strands in a given fiber optic bundle 800, the received light is merged at or within the fiber optic bundle 800 or within the optical sensor 332B for the purpose of increasing the overall received light level to effect better signal detection by the optical sensor 332B. As would be appreciated by one of ordinary skill in the art with the benefit of the present disclosure, while the fiber optic stands 800 are shown to have empty intervals between each fiber optic bundle 800, each fiber optic bundle 800 may abut or even intermingle with one or more adjacent fiber optic bundles 800 creating a broader interlaced mesh of fiber optic strands connected to different fiber optic bundles 800. In this manner, the fiber optic strand ends 802 facing the cavity/gap 808 may fill the entire area or leave gaps between bundles as is shown in FIGS. 8A and 8B In certain embodiments, the fiber optic strands 800 may be housed within one or more carriers 804, illustrated in FIG. 8A as 804B and in FIG. 8B as 804A. The carriers 804 may be made of an opaque material. In certain embodiments, the carriers 804 may be solely designed to support the fiber optic strands 800. The carriers 804 may be made of Arlon 1000 (Polyether Ether Ketone (PEEK)) or other PEEK material, Teflon, Nylon, hardened resin, plastic or other material, preferably injected or machined into a molded ring, or any other suitable material able to support the fiber optic strands 800, as would be appreciated by one of ordinary skill in the art with the benefit of the present disclosure. In certain embodiments, each carrier 804 may be individually connected on opposing sides, for example, a first side 801B of carrier 804B may be connected to the drill string 204 and a second side 803B of carrier 804B may abut a gap 808, and a first side 801A of carrier 804A may abut a gap 808 and a second side 803A of carrier 804A may be connected to the housing 202. In this manner, more than one gap 808 may exist and the gaps may not align with each other. In certain embodiments where the fiber optic stands 800 are utilized to facilitate light dispersion or collection, one may select an identical configuration for collecting light in either direction wherein fiber optic stands 800 are bundled to collect light in front of or within an optical sensor 332. Likewise, one may select the option of light dispersion in both directions wherein fiber optic strands 800 may be bundled in front of the transmitting bulb 330 and may then disperse light in a dispersion pattern across the interface area 806. As would be appreciated by one of ordinary skill in the art with the benefit of the present disclosure, the open end of the fiber optic stands 800 may face the cavity/gap 808 of the interface area 806 and may be in a grid arrangement or in any other suitable arrangement, including just one row or column of strands or just one strand. The thickness of each strand and the number of strands may be adjusted as required to provide the best signal transfer across the interface area 806 to the optical sensor(s) 330. FIG. 8C shows an end view of the open end of the fiber optic strands 800. In certain embodiments in accordance with the present disclosure, light may enter and/or exit the fiber end(s) 802 from or into the cavity/gap (not shown) of the interface area (not shown) between the transmitting bulbs (not shown) and the optical sensors (not shown).

As would be appreciated by one of ordinary skill the art with the benefit of the present disclosure, in certain embodiments, any system components, such as wires or electronics for power and communication transmission, sensors, controls and actuators utilized in an optical coupling system in accordance with the present disclosure (e.g., the transmitting bulbs, optical sensors, transceiver modules, and communication buses, and components associated therewith) may be partially or completely surrounded by an electrically and/or magnetically conductive member to provide electromagnetic shielding from large electromagnetic pulses. As would be appreciated by one of ordinary skill the art with the benefit of the present disclosure, such conductive member can be made of mu-Metal or other high magnetically permeable material. In addition, layers of graphene or other conductors may be included on the shielding to enhance electrical conductivity and thus may reduce the electric field penetration into the cavity containing the electronics. In certain embodiments, the conductive member may reduce or eliminate damaging and/or interfering electromagnetic radiation and/or prevent electromagnetic radiation from reaching sensitive electronics in the housing either directly into the cavity holding the electronics or via conductors leading into or away from the electronics cavity. In such embodiments, fiber optic cables may be utilized to lead into and away from the electronics cavity provided that a local power source is provided for the electronics in the cavity such as batteries or a generator.

As would further be appreciated by one of ordinary skill the art with the benefit of the present disclosure, the optical coupling system described herein may have a number of uses. For example, an optical coupling system in accordance with the present disclosure may provide for increased data rate transfer in conjunction with the telemetry modules described herein.

An embodiment of the present disclosure is an optical communication system in a downhole tool. The optical communication system includes a rotation-varying outer housing that is at least partially rotationally decoupled from an inner member. The inner member is at least partially disposed within the rotation-varying outer housing. The optical communication system also includes one or more transceiver modules, one or more transmitting bulbs rotationally coupled to one of the outer housing or the inner member, and one or more optical sensors rotationally coupled to one of the outer housing or the inner member. The transmitting bulbs are configured to transmit light over at least a portion of a cavity between the transmitting bulbs and the optical sensors, and the optical sensors are configured to receive light over at least a portion of a cavity between the transmitting bulbs and the optical sensors.

Optionally, the inner member of the optical communication system is a rotating member. Optionally, the rotating member is a drill string. Optionally, the transmitting bulbs and optical sensors are configured to establish a bi-directional communications link between the inner member and outer housing. Optionally, each of the one or more transceiver modules is at least one of a transmitter, a receiver, or both. Optionally, the one or more optical sensors and the one or more transmitting bulbs are proximate to one of the inner surface of the outer housing or outer surface of the inner member, and the one or more optical sensors are positioned opposite the one or more transmitting bulbs. Optionally, at least one of the transceiver modules is configured to detect communication between at least one transmitter bulb and at least one optical sensor. Optionally, the optical communication system further includes a light-diffusing element positioned between the one or more optical sensors and the one or more transmitting bulbs. Optionally, the light-diffusing element is in physical contact with the one or more optical sensors and the one or more transmitting bulb.

Optionally, the optical communication system further includes one or more communication buses coupled to the one or more transceiver modules for transmitting and receiving signals between the one or more optical sensors and the one or more transmitting bulbs, and optionally, the one or more transceiver modules convert one or more electrical signals via the one or more communications buses into a modulated format suitable for operating the one or more optical sensors and the one or more transmitting bulbs. Optionally, the optical communication system further includes one or more conductive members operable to electromagnetically shield one or more of the transmitting bulbs, optical sensors, transceiver modules, or communication buses from electromagnetic radiation.

Optionally, the optical communication system further includes a ring of open ended fiber optic strands. Optionally, a first end of the ring of open ended fiber optic strands is positioned in front of the one or more transmitter bulbs and a second end opposite the first end is positioned towards a light path on which the light from the one or more transmitter bulb travels to reach the one or more optical sensors.

Another embodiment of the present disclosure is a method for monitoring oil contamination in a cavity between an inner member and a rotation-varying outer housing. The method includes the step of introducing the inner member and the rotation-varying outer housing into a borehole. The inner member is at least partially disposed within the outer housing. The method further includes the steps of providing one or more transceiver modules, rotationally coupling one or more transmitting bulbs to one of the outer housing or the inner member, and rotationally coupling one or more optical sensors to one of the outer housing or the inner member. The method further includes the steps of transmitting telemetry data between at least one transmitting bulb and at least one optical sensor and monitoring a light signal transmitted from at least one transmitting bulb to at least one optical sensor.

Optionally, each one or more transceiver modules is at least one of a transmitter, a receiver, or both. Optionally, a bi-directional communications link is established between the inner member and outer housing. Optionally, the method further includes the step of monitoring an analog signal strength of the light signal transmitted from at least one transmitting bulb to at least one optical sensor. Optionally, the method further includes the step of measuring the contamination of a fluid in the cavity by monitoring the analog signal strength.

Another embodiment of the present disclosure is an optical communication system in a downhole tool. The optical communication system includes an inner member at least partially disposed within the rotation-varying outer housing. The optical communication system further includes one or more transceiver modules at least partially within a cavity between the inner member and the outer housing. Each one or more transceiver modules is at least one of a transmitter, a receiver, or both. The optical communication system also includes one or more transmitting bulbs rotationally coupled to one of the outer housing or the inner member, and one or more optical sensors rotationally coupled to one of the outer housing or the inner member. The transmitting bulbs are configured to transmit light over at least a portion of a cavity between the transmitting bulbs and the optical sensors, and the optical sensors are configured to receive light over at least a portion of a cavity between the transmitting bulbs and the optical sensor. The optical communication system further includes a reference point hub, and the hub is positioned between at least one transmitting bulb and at least one optical sensor. Optionally, the inner member rotates and upon each full rotation, a reference point is marked at the reference point hub to measure the variance rate of a light signal transmitted across the cavity between the at least one transmitting bulb and the at least one optical sensor. Optionally, one of the position of the inner member, the revolutions per minute of the inner member, or the torsional vibration of the inner member is measured via the variance rate of the light signal.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. An optical communication system in a downhole tool comprising:
   a rotation-varying outer housing,
      wherein the rotation-varying outer housing is at least partially rotationally decoupled from an inner member, and
      wherein the inner member is at least partially disposed within the rotation-varying outer housing;
   one or more transceiver modules;
   one or more transmitting bulbs rotationally coupled to one of the outer housing or the inner member; and
   one or more optical sensors rotationally coupled to one of the outer housing or the inner member,
      wherein the transmitting bulbs are configured to transmit light over at least a portion of a cavity between the transmitting bulbs and the optical sensors, and
      wherein the optical sensors are configured to receive light over at least a portion of a cavity between the transmitting bulbs and the optical sensors.

2. The system of claim 1, wherein the inner member is a rotating member.

3. The system of claim 2, wherein the rotating member is a drill string.

4. The system of claim 1, wherein the transmitting bulbs and optical sensors are configured to establish a bi-directional communications link between the inner member and outer housing.

5. The system of claim 1, wherein each of the one or more transceiver modules is at least one of a transmitter, a receiver, or both.

6. The system of claim 1, wherein the one or more optical sensors and the one or more transmitting bulbs are proximate to one of the inner surface of the outer housing or outer surface of the inner member, and wherein the one or more optical sensors are positioned opposite the one or more transmitting bulbs.

7. The system of claim 6, further comprising a light-diffusing element positioned between the one or more optical sensors and the one or more transmitting bulbs.

8. The system of claim 7, wherein the light-diffusing element is in physical contact with the one or more optical sensors and the one or more transmitting bulb.

9. The system of claim 1, wherein at least one of the transceiver modules is configured to detect communication between at least one transmitter bulb and at least one optical sensor.

10. The system of claim 1, further comprising one or more communication buses coupled to the one or more transceiver modules for transmitting and receiving signals between the one or more optical sensors and the one or more transmitting bulbs, and wherein the one or more transceiver modules convert one or more electrical signals via the one or more communications buses into a modulated format suitable for operating the one or more optical sensors and the one or more transmitting bulbs.

11. The system of claim 1, further comprising one or more conductive members operable to electromagnetically shield one or more of the transmitting bulbs, optical sensors, transceiver modules, or communication buses from electromagnetic radiation.

12. The system of claim 1, further including a ring of open ended fiber optic strands.

13. The system of claim 12, wherein a first end of the ring of open ended fiber optic strands is positioned in front of the one or more transmitter bulbs and a second end opposite the first end is positioned towards a light path on which the light from the one or more transmitter bulb travels to reach the one or more optical sensors.

14. A method for monitoring oil contamination in a cavity between an inner member and a rotation-varying outer housing, comprising:

introducing the inner member and the rotation-varying outer housing into a borehole, wherein the inner member is at least partially disposed within the outer housing;

providing one or more transceiver modules;

rotationally coupling one or more transmitting bulbs to one of the outer housing or the inner member;

rotationally coupling one or more optical sensors to one of the outer housing or the inner member;

transmitting telemetry data between at least one transmitting bulb and at least one optical sensor; and monitoring a light signal transmitted from at least one transmitting bulb to at least one optical sensor.

15. The method of claim 14, wherein each one or more transceiver modules is at least one of a transmitter, a receiver, or both.

16. The method of claim 14, wherein a bi-directional communications link is established between the inner member and outer housing.

17. The method of claim 14, further comprising monitoring an analog signal strength of the light signal transmitted from at least one transmitting bulb to at least one optical sensor.

18. The method of claim 17, further comprising measuring the contamination of a fluid in the cavity by monitoring the analog signal strength.

19. An optical communication system in a downhole tool comprising:

a rotation-varying outer housing;

an inner member at least partially disposed within the rotation-varying outer housing;

one or more transceiver modules at least partially within a cavity between the inner member and the outer housing;

wherein each one or more transceiver modules is at least one of a transmitter, a receiver, or both;

one or more transmitting bulbs rotationally coupled to one of the outer housing or the inner member;

one or more optical sensors rotationally coupled to one of the outer housing or the inner member; and a reference point hub, wherein the hub is positioned between at least one transmitting bulb and at least one optical sensor, wherein the transmitting bulbs are configured to transmit light over at least a portion of a cavity between the transmitting bulbs and the optical sensors, and wherein the optical sensors are configured to receive light over at least a portion of a cavity between the transmitting bulbs and the optical sensors.

20. The system of claim 19, wherein the inner member rotates and upon each full rotation, a reference point is marked at the reference point hub to measure the variance rate of a light signal transmitted across the cavity between the at least one transmitting bulb and the at least one optical sensor, and wherein one of the position of the inner member, the revolutions per minute of the inner member, or the torsional vibration of the inner member is measured via the variance rate of the light signal.

* * * * *